United States Patent [19]
Campagnolo

[11] 3,992,054
[45] Nov. 16, 1976

[54] BICYCLE SADDLE SUPPORT

[76] Inventor: Tullio Campagnolo, Corso Padova, 168, 36100 Vicenza, Italy

[22] Filed: Apr. 8, 1975

[21] Appl. No.: 566,628

[30] Foreign Application Priority Data
Apr. 11, 1974   Italy .................................. 21260/74

[52] U.S. Cl. ............................... 297/195; 403/87; 403/91
[51] Int. Cl.² ...................... B62J 1/00; F16C 11/00
[58] Field of Search ............... 297/195, 313; 403/81, 403/84, 86, 87, 90, 91, 101, 100, 121, 82, 4; 248/299

[56] References Cited
UNITED STATES PATENTS

| 381,014 | 4/1888 | Hodgson | 403/87 |
| 485,865 | 11/1892 | Hadley | 403/82 |
| 540,118 | 5/1895 | Stearns | 297/195 X |
| 582,607 | 5/1897 | Seely | 403/91 |
| 808,480 | 12/1905 | Salsbury | 248/299 |
| 2,697,975 | 12/1954 | Buhr | 403/84 |

FOREIGN PATENTS OR APPLICATIONS

| 1,180,682 | 1/1959 | France | 403/87 |
| 877,067 | 5/1953 | Germany | 248/299 |
| 1,180,682 | 1/1959 | France | 403/87 |
| 651,136 | 1/1963 | Italy | 403/84 |
| 677,677 | 8/1952 | United Kingdom | 403/84 |

Primary Examiner—James T. McCall
Attorney, Agent, or Firm—Stevens, Davis, Miller & Mosher

[57] ABSTRACT

Adjustable saddle support for bicycle comprising a pillar, a head and means for supporting a saddle in an adjustable position, said means being in engagement with said head by way of at least a pair of complementary curved surfaces under the action of a single coupling member.

10 Claims, 7 Drawing Figures

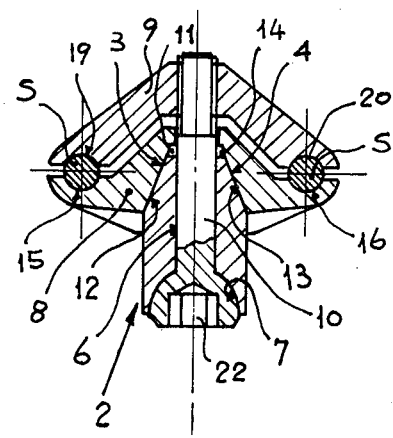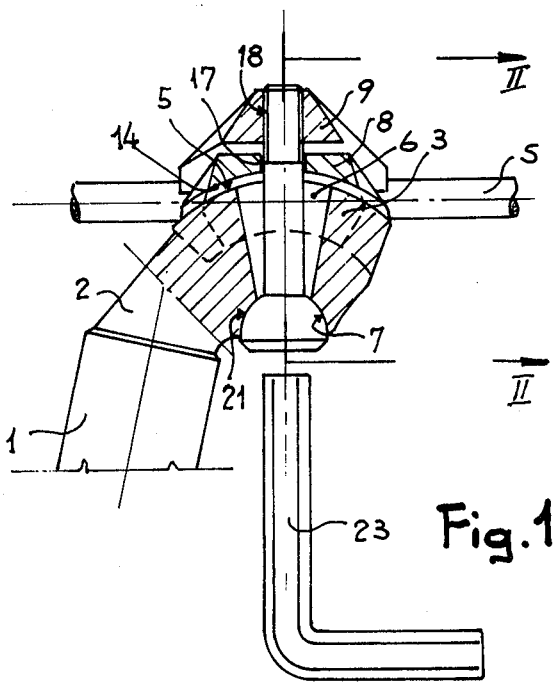

3,992,054

BICYCLE SADDLE SUPPORT

BACKGROUND OF THE INVENTION

1. Field of the Invention

In cycle construction various types of saddle supports are known, these being devices which support the saddle and allow the position of the saddle to be adjusted in a direction longitudinal to the bicycle, in inclination and in height, so as to give the cyclist the most comfortable and convenient position, and in the case of competition cycles, the position which most suitably allows him to attain maximum performance.

2. Description of the prior art

In one type of saddle support which has been universally accepted for many years, especially in the sports field, means arranged to support a saddle in an adjustable position and removably lock its frame, are associated with a head formed in one piece with, and at the top of a pillar, which is inserted into the saddle tube of a bicycle frame.

In this type of saddle support, the adjustment of the saddle position has been made up to the present, by operating a pair of setting and locking members, which always requires attention, experience and time. Moreover the construction of the saddle support is relatively complicated and costly, and comprises a fair number of parts.

The saddle support according to the present invention eliminates these drawbacks, in that it comprises a small number of parts which are easily assembled and are held together by a single setting and locking member, which enables a wider and faster adjustment of the saddle position, without demanding any particular experience from the operator.

SUMMARY OF THE INVENTION

The saddle support according to the invention, which is of the type heretofore stated, in which means for supporting a saddle in an adjustable position and removably locking its frame, are associated with a head formed in one piece with, and at the top of a pillar for insertion into the saddle tube of a bicycle frame, is essentially characterized by the fact that said means are engaged with said head by way of at least one pair of complementary curved surfaces or revolution, with common axis perpendicular to the general plane of the saddle support, under the action of a single coupling member, which is also engaged with the head or with said means by way of at least one pair of complementary curved surfaces, the curvature of which corresponds with that of said first pair of surfaces.

Preferably, said head comprises at its top two lateral tracks, formed from opposing spaced-apart portions of conical surfaces, which give to the head itself a wedge shape, and the common axis of which is perpendicular to the general plane of the saddle support. This axis may be either below the head or above the head. In the first case, the saddle support means preferably comprise a cross support, with a lower central seat apt to mate with the upper wedge part of the head and to slide, with two conical surfaces which bound it laterally, on said conical surface tracks of the head, so as to oscillate about the common axis of said tracks, and a pair of upper lateral seats, parallel to said lower seat and apt to house the elements of the saddle frame to be locked; and a locking stirrup, with two lower lateral parallel seats apt to co-operate with the upper lateral seat of the support, for housing said saddle frame elements, the stirrup being pressed on the support, and the stirrup-and-support unit being in turn pressed on the head by said single coupling member. This coupling member appropriately consists of a screw, whose shank traverses a large slot-like passage in the head - which is slightly inclined in respect of the pillar of the saddle support and diverges in the general plane of the saddle support, from the bottom towards the top of the head — and then traverses a central hole in said support, in order to screw into a central threaded hole in the stirrup, while the head of said screw, which is spherical on the shank side, co-operates with a matching hemispherical seat, formed in the lower part of the head at the end of said passage, its concavity facing the same direction as that of the conical tracks.

BRIEF DESCRIPTION OF THE DRAWINGS

Further embodiments, characteristics and advantages of the saddle support according to the invention will be evident from the detailed description of the invention given hereinafter by way of example, with reference to the accompanying drawings in which:

FIG. 1 is a side view with various parts in section of the preferred embodiment of the saddle support according to the invention;

FIG. 2 is a section on the line II—II of FIG. 1;

FIG. 4 is a side view of a second embodiment of the saddle support according to the invention, of which

DESCRIPTION OF THE PREFERRED EMBODIMENTS

Figure 3:
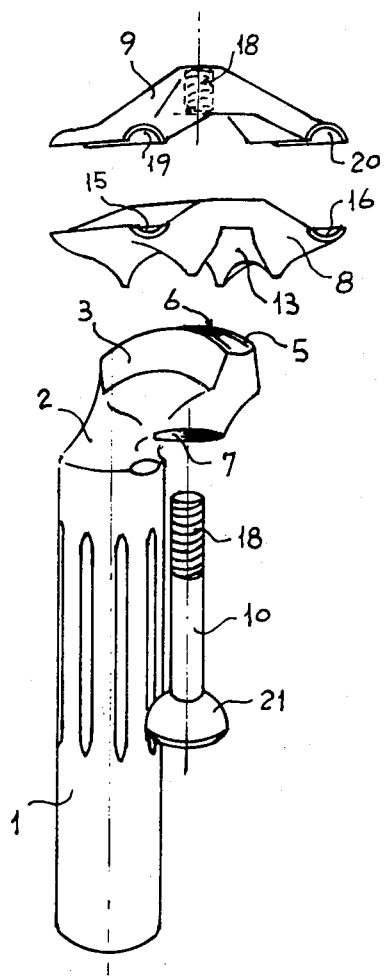
FIG. 3 is a perspective and exploded view of the saddle support of FIGS. 1 and 2.

With reference to the drawings, the saddle support shown in FIGS. 1; 2 and 3, comprises a tubular element or pillar 1, for mounting on the bicycle by insertion into the saddle tube of the frame, and a head 2 formed in a single piece with the element 1. The head 2 is of characteristic formation, being curved and wedge shaped at its top, as can be seen from the drawings, and this shape is determined by the presence of two tracks 3 and 4, formed laterally at the top of the head and consisting of opposing portions of conical surfaces, whose common axis passes below the head and is perpendicular to the general plane of the saddle support defined by the plane of the drawing in FIG. 1. The head 2 is bounded at its top, between the tracks 3 and 4, by a slightly concave substantially cylindrical surface 5. The head 2 is traversed at its center by a large slot-like passage 6, which is slightly inclined but substantially parallel to the tubular element or pillar 1 and which diverges upwards in the plane of the saddle support as heretofore defined. This passage 6 opens downwards onto a hemispherical seat 7, formed in the lower part of the head 2 with its concavity facing downwards, in the same direction as that of the tracks 3 and 4.

The saddle support according to the invention also comprises a cross support 8 and a stirrup 9, together with a screw 10, which forms the member for connecting and locking these parts and for locking the saddle onto the head 2.

The cross support 8 is a solid metal body comprising a lower central seat 11, bounded laterally by conical surfaces 12 and 13, complementary to the conical surfaces which form the tracks 3, 4 of the head 2, and bounded at the top by a cylindrical surface 14, and also comprising a pair of upper lateral seats 15 and 16, parallel to the lower seat 11 and designed to house the elements S of the saddle frame to be locked. The body of the support 8 is traversed at its centre by a through hole 17.

The stirrup 9 consists of a metal body of shape complementary to the upper part of the support 8, provided at its centre with a threaded hole 18 and laterally with two lower parallel seats 19 and 20, designed to co-operate with the seats 15 and 16, to contain the frame elements S of the saddle to be locked.

The screw 10, which forms the connecting and locking member for the saddle support and, at the same time, the only member which has to be operated for adjusting the saddle position when assembly is complete, comprises a screw with a head connected to its shank by way of a spherical surface 21 and comprising externally a recessed hexagonal seat 22, for receiving the end of a male hexagonal bar-type key 23.

In assembly, the support 8 is placed upon the head 2, so as to house the upper wedge part of said head in its lower seat 11, the lateral conical surfaces 12 and 13 of said seat 11 mating with the complementary conical surfaces of the tracks 3 and 4 of the head. The stirrup 9 is mounted on the support 8, in such a manner that the lateral seats 15, 16 and 19, 20 of these pieces form two housings for receiving and embracing the frame elements S of the saddle to be locked. Then, the spherically headed screw 21 is inserted from below into its seat and is screwed to the stirrup 9.

When the saddle frame elements S are inserted into the saddle support, as shown in FIGS. 1 and 2, the various parts become engaged by tightening the screw 10. The stirrup 9 locks the saddle frame against the support 8, so fixing the saddle longitudinal position, and the unit formed by the support 8 and stirrup 9 is locked onto the head 2 in a determined position, so setting the saddle inclination according to the position of the support 8 along the tracks 3, 4, and to the corresponding inclination of the shank of the screw 10 into the passage 6. This position is stable, on one hand, thanks to the presence of the complementary conical surfaces of the tracks of the head and of the lower seat 11 of the support — which ensure completely secure engagement by a wedging-in effect, on tightening the screw 10 — and, on the other hand, thanks to the spherical design of the head portion of the screw 10 close to the shank, and of the seat 7 provided for it in the head — which ensure perfect transmission of the traction force of the screw 10, when tightened.

It is evident that any saddle adjustment is both rapid and simple. It is in fact sufficient to loosen the single screw 10 (by turning it with the male key 23, which can be easily and freely operated), in order to slacken the connection between all the parts of the saddle support and make it possible, on one hand, to longitudinally move the saddle frame elements S in their seats 15, 19 and 16, 20 — so obtaining longitudinal saddle adjustment — and, on the other hand, to oscillate the support 8 along the tracks 3, 4, about the axis of the conical surfaces forming said tracks — so as to adjust the saddle inclination. When the new desired saddle position has been set, the screw 10 is again tightened to obtain stability in this position. The operation is simple, rapid, easy to carry out, and allows the saddle position to be adjusted as accurately as is desired.

Figure 4:
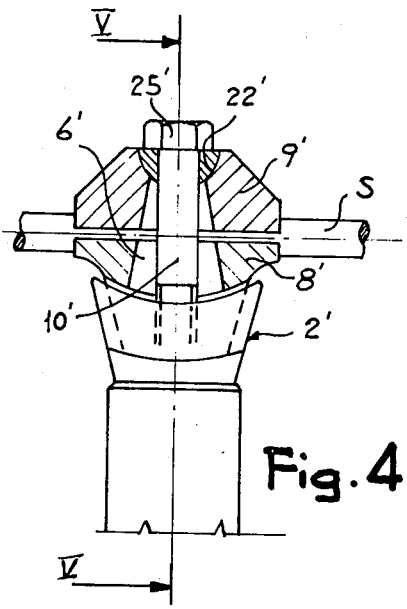
Figure 5:
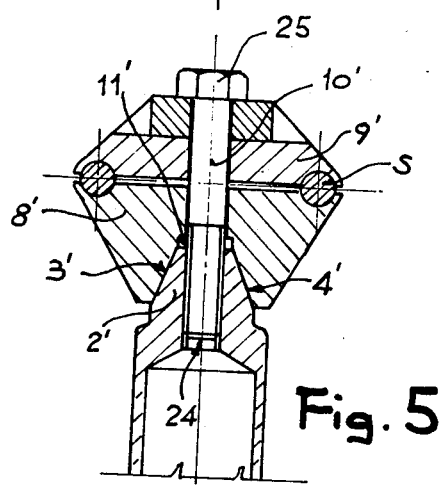
FIG. 5 is a section on the line V—V of FIG. 4.

In the embodiment shown in FIGS. 4 and 5, the arrangement of the various saddle support parts is slightly different from that of the embodiment described in FIGS. 1, 2 and 3. The head 2' of the saddle support is made with its upper wedge part bounded laterally by two tracks 3', 4', with conical surfaces having their common axis perpendicular to the general plane of the saddle support, above the head 2'.

The design of the support 8', and particularly of its lower seat 11' complementary to the head 2', is correspondingly modified. Moreover, in this embodiment, the spherically headed screw 10' is arranged with its head engaging an upwardly facing spherical seat 22', at the top of the stirrup 9'; said screw traverses a slotted passage 6', which diverges in the general plane of the saddle support from the stirrup 9' to the head 2', and which is formed in the elements 8' and 9', and screws into a threaded hole 24, formed at the top of the head. The screw 10' finally comprises a common hexagonal head 25 which can be operated by an ordinary spanner.

This saddle support evidently behaves in a manner substantially similar to that of the previous embodiment, both with regard to the mechanism of coupling its constituent parts together and of coupling these last ones to the saddle frame elements to be supported, and with regard to the operations for adjustment of the longitudinal position and inclination of the saddle, the only differences in this respect being the different manner of slackening and locking the saddle support means, and the different path which these means take during the adjustment operation: in FIGS. 1 and 2, the concavity of said path faces downwards, whereas in FIGS. 3 and 4, the concavity is facing upwards.

Figure 6:
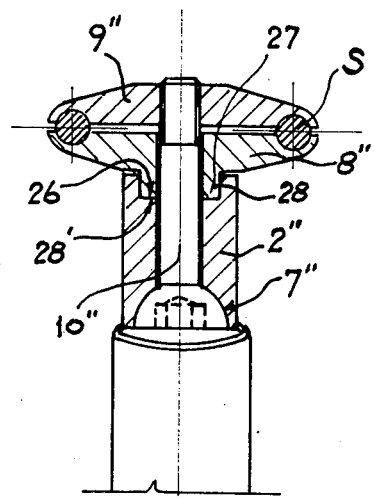
FIG. 6 is a section on the line VI—VI of FIG. 7 of a third embodiment of the saddle support according to the invention.
Figure 7:
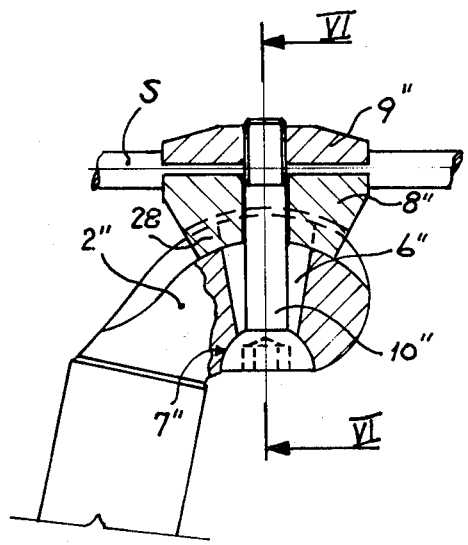
FIG. 7 is a side view of the saddle support of FIG. 6.

The difference between the embodiments shown in FIGS. 1 to 5 and that shown in FIGS. 6 and 7, is more marked. In this last embodiment, the saddle support according to the invention comprises a head 2", the upper curved part of which is in the form of a cylindrical surface traversed by a wide central cavity 26, the base of which consists of a concave cylindrical track 27. The support 8" co-operates with the head 2", said support comprising at the bottom a longitudinal cylindrical projecting portion 28 arranged to sit in the cavity 26, and the end surface 28' of which engages the track 27. The saddle support does not differ otherwise from that of FIGS. 1, 2 and 3, except for the more simple structure of the support 8", always traversed by the locking screw 10", and of the stirrup 9", into which said screw 10" screws. As in the case of the saddle support of FIGS. 1, 2 and 3, the screw 10" traverses a passage 6" formed in the head 2" and diverging upwards in the general plane of the saddle support, the screw comprising a hemispherical head housed in a corresponding cavity 7" at the bottom of the head.

The operation and adjustment of the saddle support of FIGS. 6 and 7 do not differ from those of the previous embodiments. It should however be noted that in this last embodiment of the saddle support, there is no mutual wedging-in effect between the head and the support, as is determined in the saddle supports of the previous embodiments by the co-operation between the pairs of conical surfaces of the component parts. This means that it is necessary to tighten, more strongly, the screw 10" so as to ensure coupling of the parts and prevent any tiresome slippage during use of the saddle. This drawback may be reduced (even though in practice it is completely negligible) by suitably treating or machining the co-operating surfaces of the head 2'' and support 8''.

Many further embodiments of the illustrated saddle support could obviously be devised by experts of the art, without thereby departing from the scope of the present invention. Any modifications to the described embodiments also fall within the same scope.

I claim:

1. Adjustable saddle support for supporting bicycle saddles and the like, of the type in which means for supporting a saddle in an adjustable position and removably locking its frame, are associated with a head formed in one piece with, and at the top of a pillar for insertion into the saddle tube of a bicycle frame, in which said means are engaged with said head by way of two pairs of complementary conical surfaces, said head comprises at its top two lateral tracks, formed from spaced-apart opposing portions of conical surfaces having a common axis, which surfaces bestow on it a wedge-like configuration, said saddle support means comprise: a cross support, with a lower central seat adapted to mate with the upper wedge part of said head and to slide, with two conical surfaces which bound it laterally, on conical surface tracks of the head, so as to oscillate about the common axis of said tracks, and a pair of upper lateral seats, parallel to said lower seat and adapted to house the saddle frame elements to be locked; and a locking stirrup, comprising two lower lateral parallel seats adapted to co-operate with the upper lateral seats of the cross support, for housing said saddle frame elements, the stirrup being pressed on to the support, and the stirrup-and-support unit being in turn pressed on to the head by a single coupling member.

2. Saddle support as claimed in claim 1, wherein said single coupling member consists of a screw, whose shank traverses a large slot-like passage in the head, this passage being slightly inclined in respect of the pillar of the saddle support and diverging in the general plane of the saddle support from the bottom towards the top of the head, and then traverses a central hole in said cross support, in order to screw into a central threaded hole in the stirrup; while the head of said screw which is hemispherical on the shank side, co-operates with a matching hemispherical seat, formed in the bottom of the head at the end of said passage, its concavity facing the same direction as the concavity of said tracks.

3. Saddle support as claimed in claim 2, wherein the head of said screw comprises a recessed hexagonal seat, for receiving a male operating key.

4. Saddle support as claimed in claim 1, wherein said single coupling member consists of a screw, whose shank traverses a large slot-like passage — formed in the support and stirrup, in a direction substantially parallel to the pillar of the saddle support and diverging in the general plane of the saddle support, from the stirrup towards the support and head — and screws into a central threaded hole of the head, formed between said conical surface tracks, while the head of said screw, which is hemispherical on the shank side, co-operates with a matching hemispherical seat, formed in the top of said stirrup at the end of said passage, its concavity facing in the same direction as the concavity of said tracks.

5. Saddle support as claimed in claim 4, wherein the head of said screw comprises an outer hexagonal part adapted to be engaged by a spanner.

6. Adjustable saddle support for supporting bicycle saddles comprising a head, a pillar integrally attached thereto for insertion into the saddle tube of a bicycle frame, means for supporting a saddle in an adjustable position engaged with said head by way of at least one pair of complementary cylndrical surfaces having a common axis perpendicular to the general plane of the saddle support and a single coupling member engaging said head by way of at least one pair of complementary curved surfaces, the curvature of which corresponds with that of said first pair of surfaces.

7. Saddle support as claimed in claim 6, wherein said head ends at the top with a cylindrical surface, comprising a large longitudinal recess, the base of which is a cylindrical track.

8. Saddle support as claimed in claim 7, wherein said saddle support means comprise: a cross support, provided with a lowerly projecting central portion, apt to be housed in said recess of the head and to slide with a cylindrical surface, which bounds it externally, on said cylindrical track, and with a pair of upper lateral seats, parallel to said lowerly projecting portion and apt to receive the saddle frame elements to be locked; and a locking stirrup, comprising two lower parallel lateral seats, apt to co-operate with said upper lateral seats of the support, to contain said saddle frame elements, the stirrup being pressed onto the support and the stirrup-and-support unit being in turn pressed onto the head by said single coupling member.

9. Saddle support as claimed in claim 6, wherein said coupling member consists of a screw, whose shank traverses a large slot-like passage in the head, this passage being slightly inclined in respect of the pillar of the saddle support and diverging in the general plane of the saddle support from the bottom to the top of the head, and then traverses a central hole in said cross support, in order to screw into a central threaded hole in the stirrup; while the head of said screw which is hemispherical on the shank side, co-operates with a matching hemispherical seat, formed in the bottom of the head at the end of said passage, its concavity facing in the same direction as the concavity of said cylindrical surface.

10. Saddle support as claimed in claim 9, wherein the head of said screw comprises a recessed hexagonal seat for receiving a male operating key.

* * * * *